United States Patent

Firth et al.

[15] 3,682,179

[45] Aug. 8, 1972

[54] HOOF REPAIR DEVICE

[72] Inventors: Jay A. Firth, 9820 W. 86th St., Overland Park, Kans. 66212; Carlton Power, 1501 Davis Ave., Terre Haute, Ind. 47802

[22] Filed: May 1, 1970

[21] Appl. No.: 33,777

[52] U.S. Cl. ..........................128/336, 54/82, 128/82, 128/157
[51] Int. Cl. .........A61d 9/00, A61f 13/00, B68c 5/00
[58] Field of Search ...54/82; 128/82, 82.1, 155, 156, 128/165, 166, 169, 157

[56] References Cited

UNITED STATES PATENTS

| | | | |
|---|---|---|---|
| 180,295 | 7/1876 | White | 54/82 |
| 230,155 | 7/1880 | Spence | 54/82 |
| 2,560,712 | 7/1951 | Bell | 128/165 X |
| 3,118,449 | 1/1964 | Bane | 128/336 |
| 3,373,741 | 3/1968 | Hill et al. | 128/165 X |

OTHER PUBLICATIONS

Jenny et al., " Hoof Repair with Plastics," In J.A.V.M.A. 147 12: 1340– 1345, 1965.

Evans et al., " The Repair of Hoof Cracks With Acrylic," In J.A.V.M.A. 148 4: 355– 359, 1966.

*Primary Examiner*—Channing L. Pace
*Attorney*—Dominik, Knechtel & Godula

[57] ABSTRACT

A method for treating and repairing hooves of animals by applying room temperature moisture curing urethane resin to the hoof surface and to defects such as cracks. A device used in the method includes a flexible mesh band having a mesh portion to cover the defect or crack, and attached ties or streamers of sufficient length to encircle the periphery of the hoof so that the band may be tightly tied therearound. The room temperature moisture curing urethane resin is used in conjunction with the mesh portion, and the band is untied following cure of the resin over the mesh portion. The ties or streamers are removed leaving the mesh bonded to the hoof.

5 Claims, 8 Drawing Figures

Patented Aug. 8, 1972
3,682,179
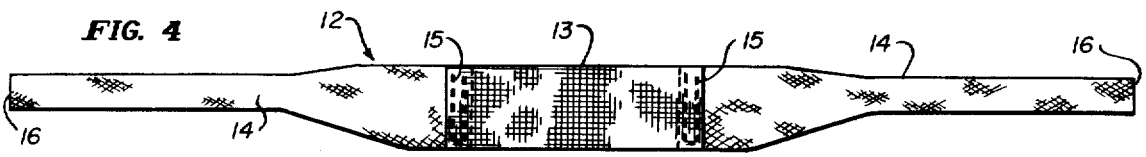
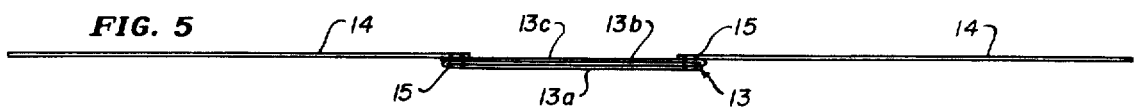
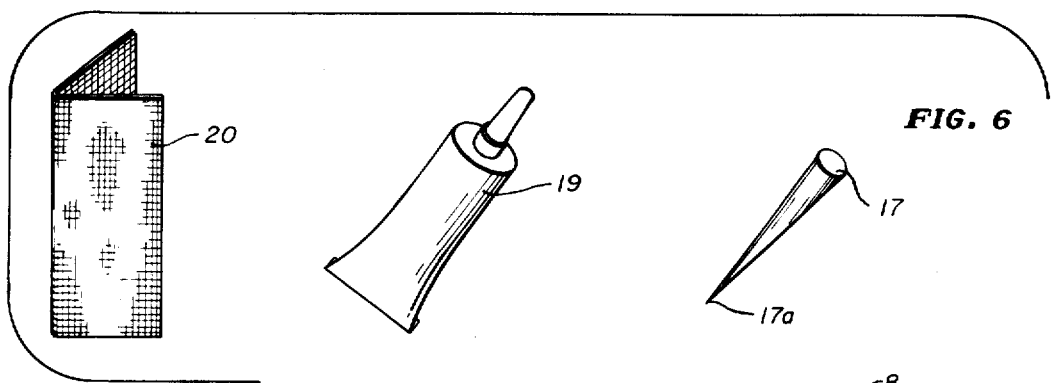
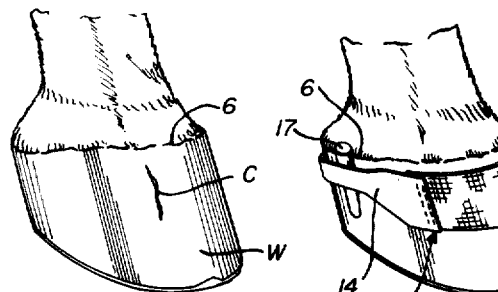
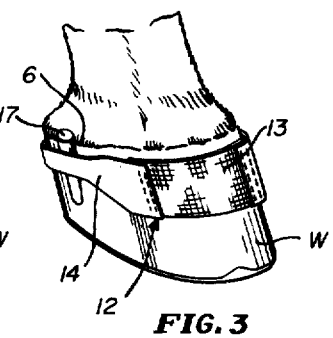
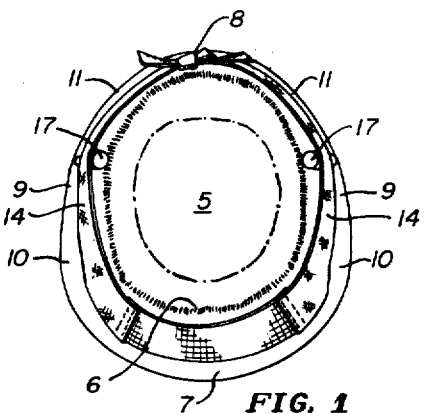
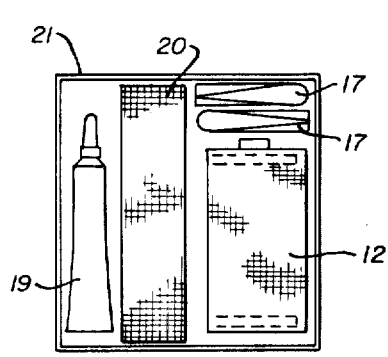
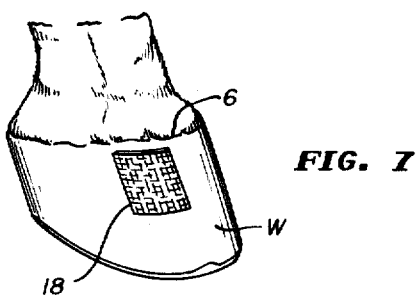
INVENTORS
Jay A. Firth DVM
Carlton Power
BY
Dominik, Knechtel & Godula
ATTYS.

HOOF REPAIR DEVICE

This invention relates to a method and device for repairing and treating hooves of animals; and particularly relates to employing room temperature moisture curing urethane resins alone and in conjunction with a special mesh band to protect and repair such hooves.

Many efforts have been made to treat and repair the hooves of ungulate mammals, particularly horses. Such hooves have been known to develop various problems including defects to the horn wall, hoof cracks, seedy toe, chronic laminitis, deformed feet, and the like. These problems, in one way or another, call for prophylactic or therapeutic efforts in protecting, treating or repairing the hoof.

It has become recognized in the art that plastics may be employed for problems such as those which have been described. See, for example, "Hoof Repair with Plastics," Jenny et al., J. A. V. M. A., vol. 147 No. 12, p. 1,340. Epoxy plastics of the adhesive type have been recommended for such purposes, but these plastics are objectionable because of poor curing actions in the presence of moisture. The use of a successful room temperature moisture curing system would be a highly desirable goal because such resin could be used to protect the hoof from adverse brittleness through moisture loss, to rebuild hooves, to repair serious hoof defects, and to effectively meet the recurring problem of cracks, particularly quarter cracks. The occasional efforts in the art to find such a useful resin system have not, apparently, met with success. Among the plastics found wanting, for a variety of reasons, is included the acrylics. These plastics tended to be much harder than normal hoof horn, were not sufficiently elastic, and exhibited poor adhesive properties due to the natural moisture content of the hoof. hoofs is that of quarter cracks. Attempts have been made with a variety of devices to achieve such repair, including the use of plates, lacing with wire strands or twine, use of various fasteners, and the like. An example of the devices and apparatus which have been used in this area include that disclosed in issued U.S. Pat. No. 3,118,449. This issued patent teaches the use of a patch of rubber which is cemented over the crack with the help of an epoxy resin. A number of layers of material are wound around the patch, including aluminum, felt, cotton and adhesive. Infrared heat is used to cure the epoxy.

In view of the above presented matters, it is one important object of the invention to provide an improved method for more quickly treating and repairing animal hooves in a more effective manner.

It is another important object of the present invention to provide a method and assembly for treating hooves with cracks, particularly quarter cracks, by process steps which can be readily learned and quickly executed to attain excellent standards of repair.

Yet another important object of the present invention is to provide an improved method which utilizes a successful resin system for prophylactic and therapeutic treatment of animal hooves, including protection against damage, repair and restoration.

Still another important object of the present invention is to provide an assembly which can be utilized together with an improved room temperature resin curing system to repair cracks in hooves without unduly incapacitating or restraining the animal. It is a particular feature of this object that the horse, for example, may be returned to its usual activities within far shorter time periods than is possible with other attempts to repair and treat hoof cracks, such as quarter cracks.

The foregoing objects are now attained by the present invention, together with still other objects which will occur to practitioners from time to time. The attainment of such objects will be understood by reference to the following detailed disclosure, including drawings, wherein:

FIG. 1 is a plan view of a horse's hoof, partly in section, to illustrate certain anatomical features relevant to the present disclosure;

FIG. 2 is a perspective view, on a reduced scale, of a horse's hoof with a crack therein;

FIG. 3 is a view similar to FIG. 2, but showing a portion of a horses hoof with components of the assembly mounted in place during the treatment period;

FIG. 4 is a front elevational view, on an enlarged scale, of a flexible mesh band used to repair hoof cracks;

FIG. 5 is a top view of a flexible mesh band of FIG. 4;

FIG. 6 is a group perspective view of the components in the assembly;

FIG. 7 is a perspective view similar to that of FIG. 2 and FIG. 3, showing the patch area after treatment; and FIG. 8 is a top plan view, somewhat diagrammatic, showing a package assembly useful for repairing quarter cracks in hooves.

It has been discovered that room temperature moisture curing urethane resin systems are uniquely adapted to treating and repairing animal hooves. The urethane system may be selected so that when cured it possesses desired properties of elasticity, similar to the horn wall of the hoof. Further, the selected urethane system is stable and cures in the presence of moisture which is commonly present in the horn wall. A yet further advantage is that the cured urethane displays excellent adhesive properties and abrasion resistance, more than adequate to protect the repaired hoof while new tissue grows outwardly. The urethane system may be used in a prophylactic manner by applying a resin system over the entire wall surface of the horn to protect the hoof against undue brittleness from moisture loss. The urethane system may be used to restore or rebuild seriously damaged hooves.

The urethane technology is well developed, and compositions with different properties are readily available and may be selected to attain the purposes of the present invention. The urethanes, of course, are formed by reacting isocynates with polyols such as polyesters and polyethers. The room temperature moisture curing systems utilize recognized catalysts such as tertiary amines, metallic salts such as stannous octoate, and organometallic compounds such as dibutyl tin laurate. The urethane system will desirably cure so that it possesses elasticity, and the desired hardness is principally attained by the relative amounts of polyisocyanate and polyol reactant.

Separate package systems may be used wherein the isocyanate is in one package, or wherein one package contains a prepolymer system comprising isocyanate and a small portion of polyol. The other package may contain additional polyol and catalysts. The contents of the respective packages may be combined prior to application to the hoof. Convenience and control of application are better served, however, with a one-shot system wherein the urethane system may be dispensed from a single container directly to the horn wall of the hoof, and thereafter undergo curing at room temperature. Such one-shot or single package systems are available or may be readily prepared from available technical knowledge in the urethane art. An operable composition is supplied, for example, by the Spencer Kellogg Division of Textron Inc., Buffalo, New York. The urethane resins are supplied by that company under the generic trade designation of Spenkel, an under various sub-ASTM Type numbers. These systems are one-package moisture-cure compositions, which cure at ambient or elevated temperatures, with or without catalysts. These one-package systems comprise a mixture of about one-half solids and one-half solvents. The ASTM Type 2, M21–40X, sets in about 2½ hours, and hardens into a cured elastomer in about 23 hours. The ASTM-Type 2, M86–50CX, sets within one-half hour and hardens into a durable elastomer in about 2 hours. Other one-package systems available under the Spenkel trade designation include oil-modified compositions which are cured by air oxidations at ambient or slightly elevated temperatures. A two-package system is also available under the Spenkel trade designation, known further by ASTM Type 4; and includes a prepolymer system in one package and polyol-catalyst in another package.

While either a one-package or two-package system may be used, it is desirable that such system be cured at room temperature, and that the resulting cured elastomer have an elasticity generally similar to that of the horn wall. It is further desirable that the urethane system be curable in the presence of moisture, naturally present in the horn wall. It is still further desirable that the cured urethane system exhibits good adhesion. As stated, such a urethane system may be used to coat the entire horn wall as a therapeutic treatment. It may also be used to build up the hoof by repeated layered applications. It may further be used as an adhesive to bond horse shoes without nails to the hoof, and to bond elastomeric paddings to the hoof, including a preformed elastomeric urethane padding.

The described urethane system is used to particular advantage with the assembly illustrated in the drawings for treating various sand cracks and quarter cracks in the hoof. Referring now to the drawings, FIG. 1 indicates a top plan view of a horse's hoof, partly in section. The bone area of the leg is indicated by 5. The coronary band 6 is immediately above the horn wall. The front of the hoof is the toe portion 7, and the back of the hoof is the heel portion 8. The sidewalls are illustrated at 9 on opposite sides. Each sidewall has a fore quarter section 10 towards the toe 7, and a hind quarter section 11 towards the heel portion. The horn wall of the hoof extends around the bone area 5, fore and aft and side-to-side.

Sand cracks occur in the wall of the hoof, and may involve the coronary band. The cracks appear more frequently on the hind quarters of the front feet and the toes of the hind feet. The method and assembly disclosed herein may be used to treat both simple and complicated cracks in the horn wall.

The urethane system is used in conjunction with a flexible mesh band to repair thin wall or quarter cracks in the hoof. The mesh band forms a bonding flexible patch together with the cured urethane system. The method generally provides for cleaning the horn wall in the vicinity of the crack, removing the waxy periople in the area of the crack with an abrasive material, applying the urethane composition to the area in one or more applications, and then applying the flexible mesh band over the area. Referring to FIG. 2 a crack C is shown in the horn wall W, and mounted mesh band, shown generally as 12, is seen in FIG. 3.

Referring now to the view of FIG. 4, the flexible mesh band is shown as comprising an intermediate mesh portion 13, flanked by ties or streamers 14 which are securely attached to the opposite ends of the mesh portion 13 by fastening areas indicated at 15. Such fastening areas may be bonding lines, sewing, or the like. The ties 14 may be cloth bonds, and are sufficiently long so that they may encircle the horn wall periphery after the mesh portion 13 is applied against the area of the crack. The ties should be likewise sufficiently long to permit the opposite ends 16 to be securely tied at an area of the hoof approximately opposite to where the mesh portion is placed. The ties are shown as having a top to bottom dimension similar to that of the mesh portion, at least at the fastening areas 15. This provides secure fastening lines. The mesh portion 13 may comprise one or a plurality of mesh layers which may be wire or strong plastic. FIG. 5 shows the mesh portion 13 as comprising three sheets 13a–13c formed from folds of a single sheet. The plurality of sheets provide strength to the mesh portion, but allow resin to pass therethrough. The mesh size is not in any sense critical, although it is preferred that it be sufficiently small to provide a good contact surface area against the horn wall, while still permitting the urethane resin composition to fill the mesh opening to thereby obtain a bonding flexible patch after curing.

The practice of the method requires that the flexible mesh band be very tightly secured around the hoof of the animal, and to this end the assembly includes wedge elements 17 having the usual tapered end 17a. The tapered end is preferably inserted between the streamer and the horn wall from the top, and forced downwardly to increase the tightness of the flexible mesh band as the progressively thicker body of the wedge is moved between the tie and the hoof. One wedge element 17 shown positioned on one side of the horse's hoof in the view of FIG. 2. It is preferred that a plurality of such wedge element 17 be inserted between the tie or streamer in the horn wall, at least one on each of the opposite side walls of the hoof.

A preferred method for treating a sand or quarter crack in the hoof will be illustrated by reference to a particular embodiment, but it should be understood that such embodiment is not intended to represent an exclusive teaching of the invention.

The hoof of a horse having a toe quarter crack is initially treated by cleaning the area of the quarter crack with a warm water detergent solution to remove grease, oil or hoof dressing from the crack and from the adjacent wall area.

An abrasion material such as a rasp, file or carborundum cloth 20, is used to remove any abnormal horny growth, as well as substantially removing all the periople at the crack area. The area is cleaned a second time with warm detergent solution and allowed to dry.

The crack and an area of about two inches on either side thereof from the coronary band to the bearing surface is covered with a layer of urethane resin, Spenkel, ASTM Type 2, M86–50 CX, delivered in a pre-package tube 19. Thin coats or layers of the resin are applied at five minute intervals to "build up" the resin layers. The initial applications are layered and substantially abosorbed by the horn wall, but the subsequent layers are formed on this surface as "built up" layer or layers.

A plastic mesh band, such as that illustrated in FIG. 4 and FIG. 5, is wound around the hoof and tied tightly on the opposite side of the hoof. The top of the mesh band is positioned about three-eighth inch to about one-half inch below the coronary band 6. Another layer of the foregoing resin is applied to the mesh portion 13 which covers the crack in the repair area. Two wooden wedges 17 are then forced under the tie on the sides of the hoof to securely tighten the mesh band as much as possible. Another coat of the resin material is then applied to the mesh portion in the repair area, and the animal is confined to a stall for about 12 to 24 hours.

The resin is fully cured after the above time period, and the ties 14 are then cut away, together with any excess mesh portion along the margins of the repair or patch area. The patch edges are then rasped or sanded smooth with abrasion material, and the entire surface of the patch is sanded to remove any adhering dirt or bedding. Resin is then applied in thin layers to the edges and surface of the patch area, and the horse is again confined to the stall for about 12 to 24 hours to enable the resin to cure. The patch area 18 indicated in he view of FIG. 7, following final application and cure of the resin and removal of the ties. The patch area is reduced relative to the original dimensions of mesh portion 13 by the trimming and smoothing as previously described.

Following the above treatment, the animal may resume substantially normal activities. The patch area will remain in place while the horn wall grows downwardly and outwardly to replace the crack with new tissue. A great advantage of the present invention is that the animal may be active immediately after completing the repair, and while new tissue is growing.

The assembly usefully adapted for practice of the method may be conveniently delivered in package form, such as that indicated in the view of FIG. 8. In such package, the room temperature moisture curing resin system is shown as the one-package tube 19, the abrasive material is indicated as the carborundum mesh cloth 20, which is centrally creased so that the cloth may be more conveniently handled in operation and the wedges 17 are shown next to the mesh band 12. The components are shown housed in an open box 21, which may later be conveniently covered for storage or shipment.

The claims of the invention are now presented.

What is claimed is:

1. A flexible mesh band to be used in conjunction with a room temperature curing resin system for repairing cracks in hooves of animals, including
    an intermediate flexible mesh portion, said mesh portion being a strong material, including plastic and wire, said mesh portion having dimensions sufficient to cover a crack in an animal's hoof,
    tie portions securely attached to opposite ends of said portion by fastening means, said tie portions extending a distance sufficient to encircle the periphery of an animal's hoof, including an additional length for securing the opposite free ends of said tie portions together, said tie and mesh portions having a strength sufficient so that said flexible band may be very tightly secured around an animal's hoof, and
    said mesh portion having mesh openings sufficiently large to permit a room temperature moisture curing resin system to pass therethrough into contact with the horn wall of the animal's hoof.

2. A flexible mesh band as in claim 1, wherein said mesh portion comprises a plurality of mesh sheets to provide strength to the mesh portion, and said plurality of sheets permitting a room temperature moisture curing system to pass therethrough and contact the horn wall of the hoof.

3. A flexible mesh band as in claim 1, wherein said tie portions have inner ends with top to bottom dimensions substantially the same as the top to bottom dimensions of said mesh portion.

4. A flexible mesh band as in claim 1, wherein said mesh portion includes a plurality of plastic mesh sheets.

5. A flexible mesh band as in claim 4, wherein said tie portions are cloth bands, the inner ends of which are sewn to the opposite ends of said plurality of plastic mesh sheets.

* * * * *